Figure 1:
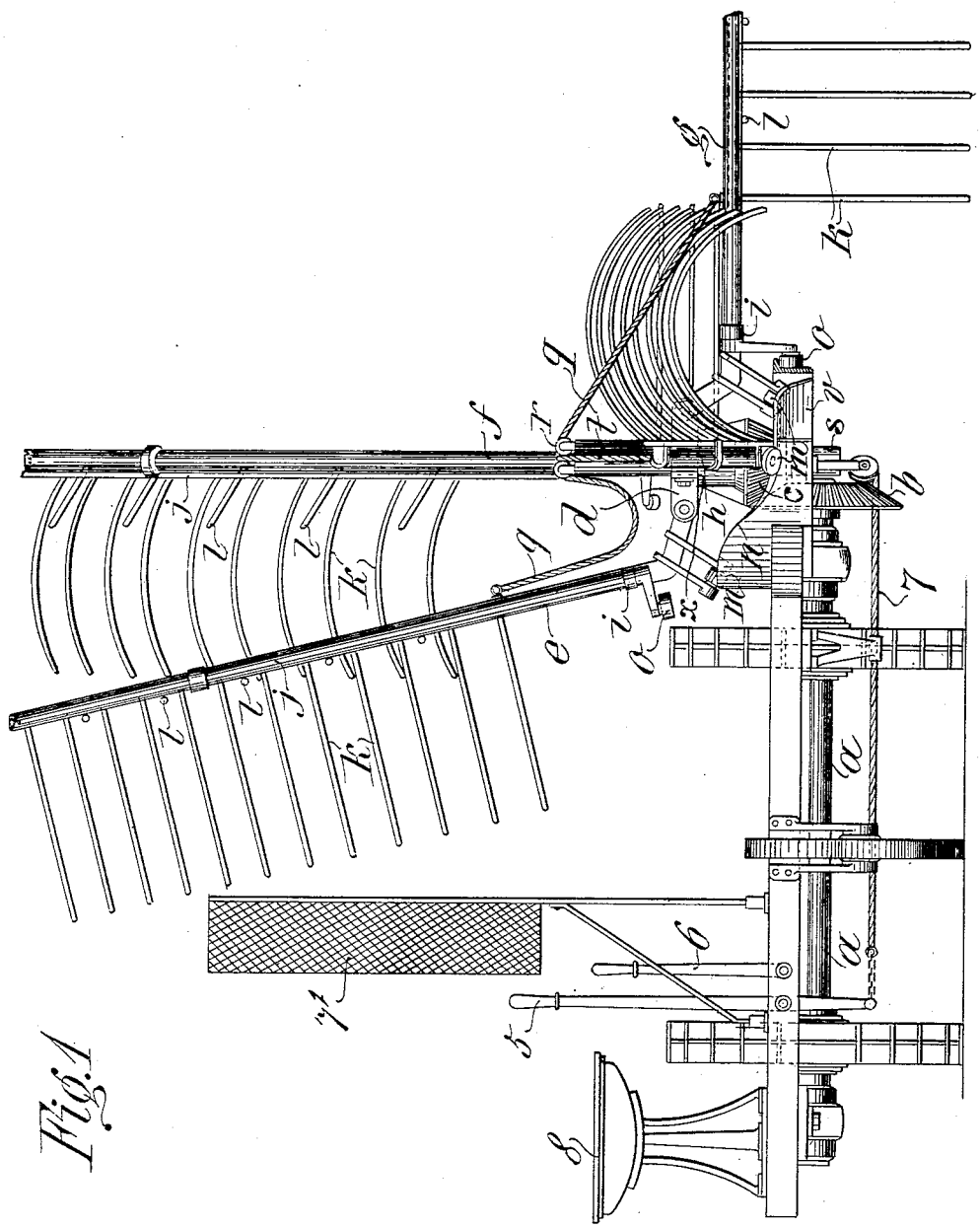

No. 751,618. PATENTED FEB. 9, 1904.
P. VON DEL NEGRO.
HAY RAKE AND TEDDER.
APPLICATION FILED APR. 10, 1903.
NO MODEL. 6 SHEETS—SHEET 1.

Witnesses:—
C. H. Schining
Gustav Heyde

Inventor:—
Paul von Del Negro
by Paul D. Sailing
attorney

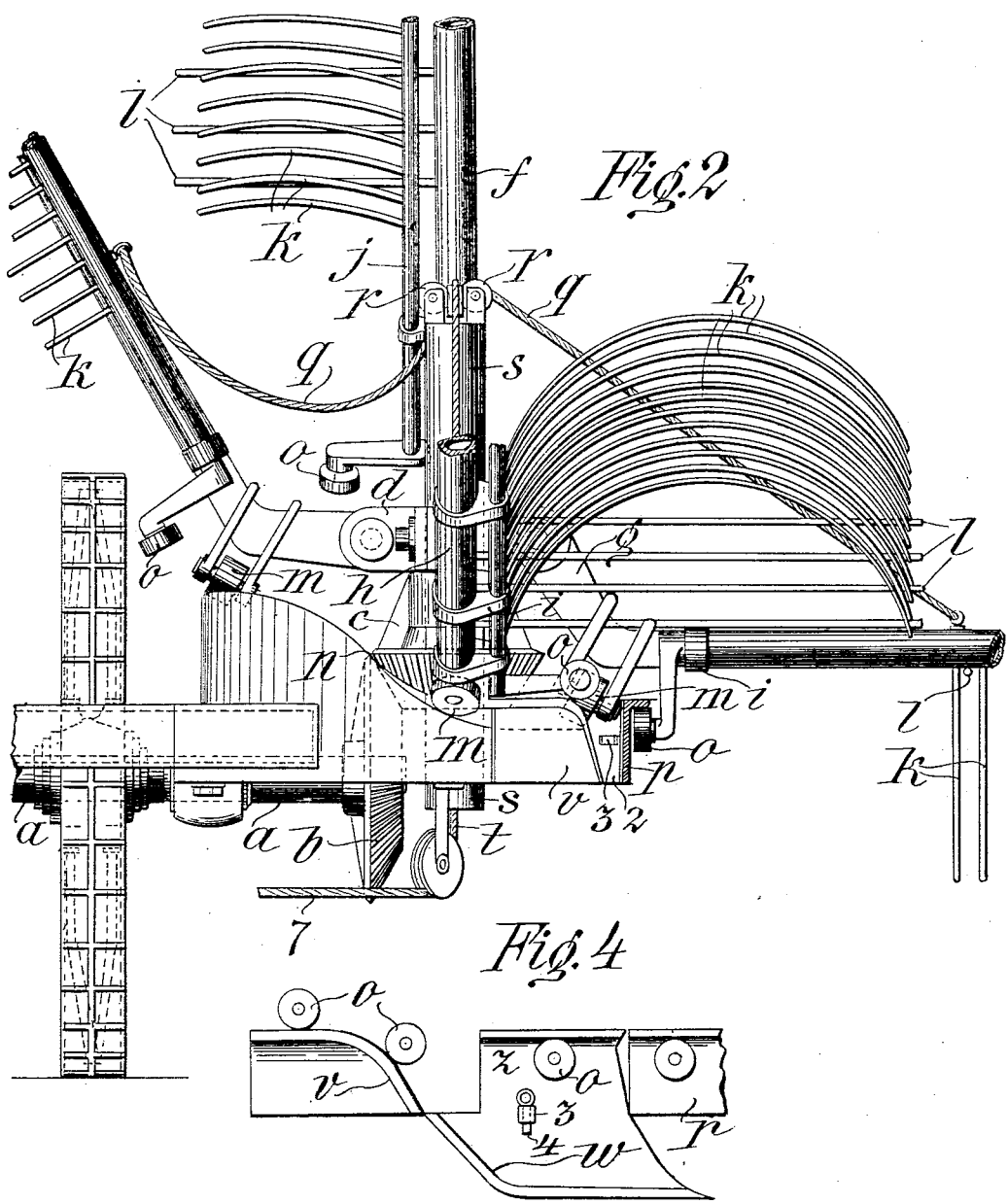

No. 751,618. PATENTED FEB. 9, 1904.
P. VON DEL NEGRO.
HAY RAKE AND TEDDER.
APPLICATION FILED APR. 10, 1903.
NO MODEL. 6 SHEETS—SHEET 3.
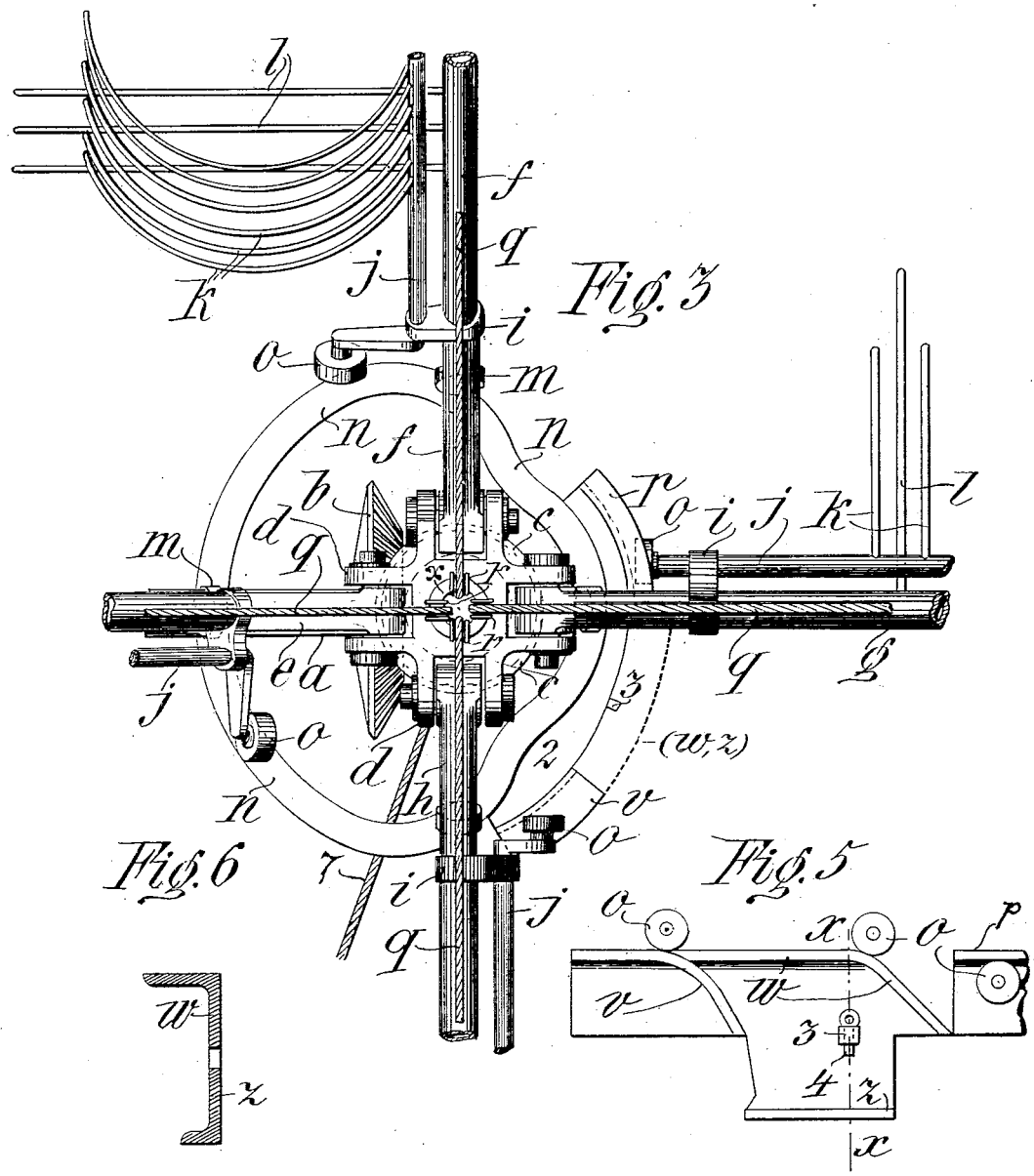

No. 751,618. PATENTED FEB. 9, 1904.
P. VON DEL NEGRO.
HAY RAKE AND TEDDER.
APPLICATION FILED APR. 10, 1903.
NO MODEL. 6 SHEETS—SHEET 4.
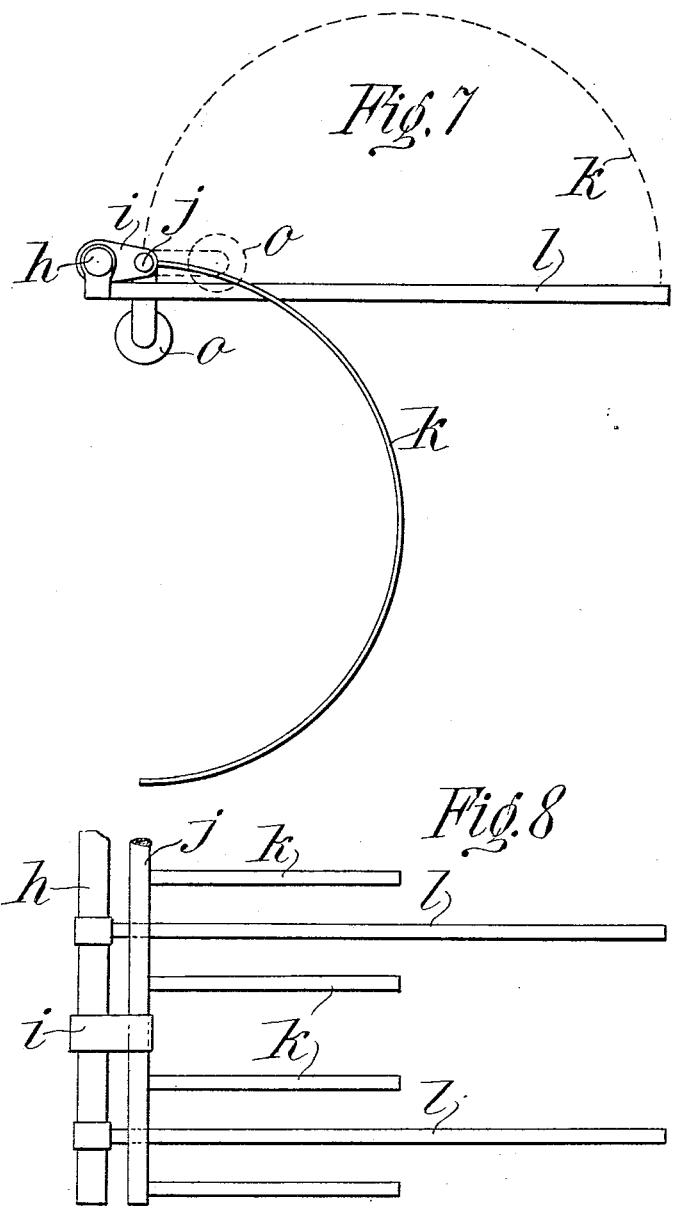
Witnesses:—
C. H. Schilling
Gustav Hyde
Inventor:—
Paul von Del Negro
by Paul E. Schilling
attorney No. 751,618. PATENTED FEB. 9, 1904.
P. VON DEL NEGRO.
HAY RAKE AND TEDDER.
APPLICATION FILED APR. 10, 1903.
NO MODEL. 6 SHEETS—SHEET 5.

Witnesses:
C. H. Schilling
Gustav Heyde

Inventor:—
Paul von Del Negro
by Paul Schilling
attorney

No. 751,618. PATENTED FEB. 9, 1904.
P. VON DEL NEGRO.
HAY RAKE AND TEDDER.
APPLICATION FILED APR. 10, 1903.
NO MODEL. 6 SHEETS—SHEET 6.

Witnesses:—
C. H. Schilling
Gustav Heyde

Inventor:—
Paul von del Negro
by Paul E. Paulding
attorney

No. 751,618. Patented February 9, 1904.

UNITED STATES PATENT OFFICE.

PAUL VON DEL NEGRO, OF SALZBURG, AUSTRIA-HUNGARY.

HAY RAKE AND TEDDER.

SPECIFICATION forming part of Letters Patent No. 751,618, dated February 9, 1904.

Application filed April 10, 1903. Serial No. 152,051. (No model.)

*To all whom it may concern:*

Be it known that I, PAUL VON DEL NEGRO, a subject of the Emperor of Austria-Hungary, residing at Salzburg, Austria-Hungary, have invented certain new and useful Improvements in Hay Rakes and Tedders, of which the following is a specification.

The ordinary hay-rakes, with a tipping head to obtain a narrow swath, only form the latter in continuous line if the operator gives full attention to the work, since the gang of teeth has always to be tipped either by hand or foot, the swath falling at right angles to the line of travel. Again, with rakes of well-known construction having several arms moved like the rakes of the corn-machine, whereby the swath lies in the line of travel, there is the disadvantage that the hay on being lifted by the immovable teeth is carried farther than is intended, so that the line of swath is irregular.

The subject of my invention is a horse-rake which combines the advantages of both the above-mentioned systems, while at the same time avoiding their disadvantages. This is effected by employing rake-arms, the teeth of which at the moment of the swath being formed—that is to say, as the rakes are being lifted—are given a tipping motion. For the purpose of enabling this rake to be employed also as a tedder the device which imparts the tipping motion instead of being permanently fixed is removable, so that the tipping takes place after the descent of the rakes, whereby each rake only seizes a small quantity of hay, which is immediately turned and dropped in such manner that the part which has been lying downward is turned upward. In order to prevent unintentional elevation of the descended rake, the guide-rollers of the rake-arms are provided with a special flange-track. The machine is also provided with means whereby the rake can be raised to avoid obstacles or for the purpose of setting the machine out of operation. For this purpose a lever is provided at the driver's seat connected by a rope running over pulleys with each of the rake-arms.

Figure 9:
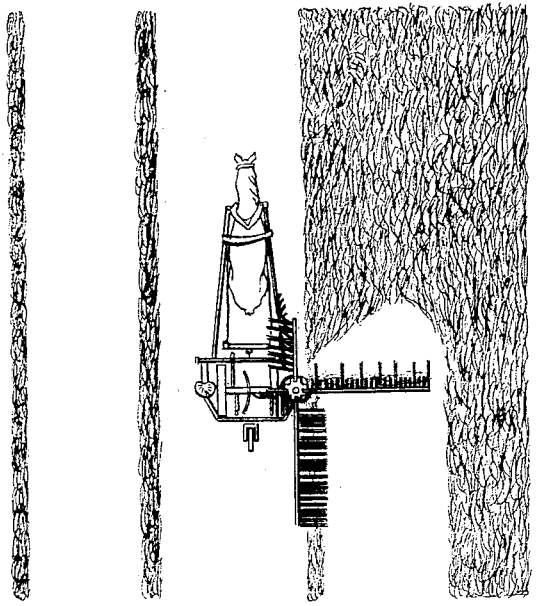
Figure 10:
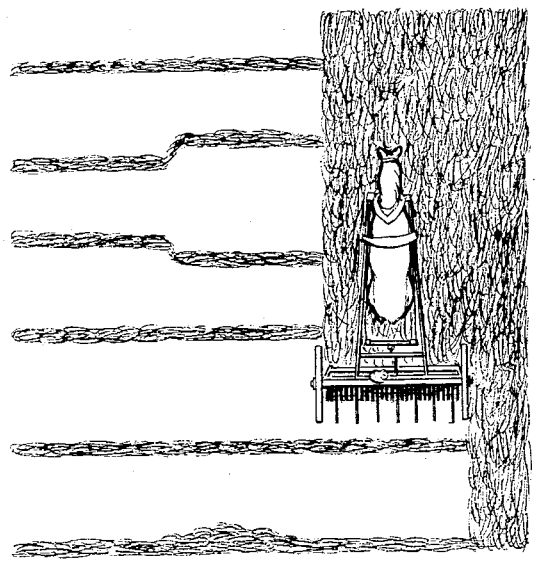
Figure 11:
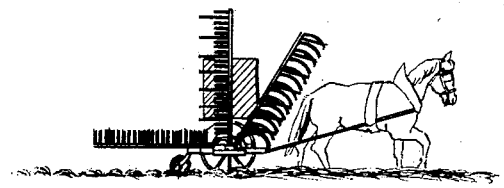
Figure 12:
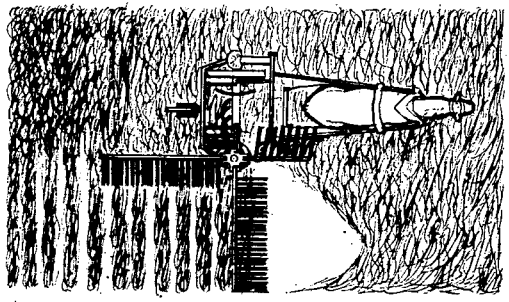
Figure 13:
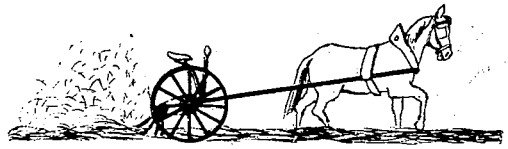

In the accompanying drawings, Figure 1 shows a side elevation of the machine. Fig. 2 is a side elevation of the working rake mechanism, parts being broken away to save space on the drawings. Fig. 3 is a plan view of the principal parts of Fig. 2. Fig. 4 is a detail of the guide-track parts in position when the machine is used as a rake. Fig. 5 is a similar view with the parts arranged in position when the machine is used as a tedder. Fig. 6 is a transverse sectional view of the part $wz$, taken on the line $x\,x$ of Fig. 5. Fig. 7 is a view in elevation of one of the rake-arms and its parts. Fig. 8 is a partial top plan view of one of the rake-arms and its parts. Fig. 9 is a plan showing the new machine at work as rake. Fig. 10 is a like view showing an ordinary horse-rake at work. Fig. 11 shows a side view of the new machine at work as tedder. Fig. 12 is a plan of Fig. 11. Fig. 13 shows an ordinary tedding-machine at work.

$a$ is the axle of the wagon, on which is keyed the bevel-wheel $b$, meshing with a second such wheel $c$, keyed to a shaft $x$, to which is also keyed the star-shaped bracket $d$, Fig. 3. A clutch with lever 6 of any well-known construction is provided, whereby the axle $a$ can be caused to be rotated by the traveling wheels. When this is the case, the motion will be transmitted by the gearing $b\ c$ to the bracket $d$.

Pivoted to the bracket $d$ are four congruent lever-arms $e\ f\ g\ h$, which carry the likewise congruent and lightly-constructed gangs of rake-teeth $k$. For the latter purpose crank-shaped arms $i$ are keyed to the arms $e\ f\ g\ h$, and in these cranks $i$ are loosely mounted the rods $j$, so that the latter are capable of readily turning on their axes. The teeth $k$ may be secured to the rods $j$ in any suitable manner and at any desired distance apart. It will be found well to locate the outer teeth somewhat more closely together than the inner ones, so that the peripheral raking motion is more vigorous than the central motion. In this manner all subsequent raking will be rendered unnecessary. The teeth should be made of the best spring-steel, so that they may be capable, by reason of their resilience, of avoiding obstructions—such as stones, molehills, &c.—and of springing back again into the correct position when such impediments have been passed. The arms $e\ f\ g\ h$ also carry clearer-rods $l$, lying below the rake-rod $j$.

On the gang of teeth $k$ turning the rods $l$ pass between the teeth, and so clear any hanging hay or the like. The management of the teeth and clearers is shown in detail in Figs. 7 and 8. Each arm $e\ f\ g\ h$ is provided with a roller $m$, running on a common track $n$, which is of annular form and encircles the shaft $s$ and ascends at the side adjacent to the wagon. In order independently of the motion imparted to the arms $e\ f\ g\ h$ by the track $n$ to be able to raise and lower the said arms at any movement, ropes $q$ are attached to the latter. These ropes pass over pulleys $r$ and into the hollow shaft $s$. Within the latter the separate ropes are united to form a rope 7, which passes over pulleys and is secured at its extremity to a hand-lever 5, located near the driver's seat. Instead of the lever 5, a crank might be provided similar to the brake-cranks of ordinary wagons. By this means the driver is enabled to raise and lower the rakes, as desired. A wirework-guard 7' is provided to protect the driver from the rakes. Each rake-rod $j$ is also provided with a roller $o$ at its inner end.

In order that the machine may be employed both as rake and as tedder, there is arranged concentrically with the track $n$ and outside the lowest part of the latter a second track, consisting of three parts. The first part is the stationary track $p$, on the rounded under side of which the rollers $o$ of the rods $j$ run for the purpose of preventing the rakes from rising unintentionally, and thus interrupting the work. Adjoining the track $p$ is the second part, which is adjustable and consists of a peculiarly-shaped guide-piece $w\ z$. The latter can be so secured that it forms a prolongation of the track $p$, and thus admits of the roller $o$ continuing its journey, Fig. 4, so that the teeth $k$ can continue their raking action. The roller $o$ now arrives at the third part of the track—the ascending portion $v$—which terminates in the line of travel and which, like the part $p$, is stationary. In this manner the roller, and with it the rod $j$ and teeth $k$, is raised—that is, the gang of teeth is tipped and the hay dumped in the direction of travel of the machine. If, however, the machine is to be employed for tedding, the guide-piece $w\ z$ must be so adjusted that its lower part $w$ lies upward, as shown in Fig. 5 in elevation and in Fig. 6 by a section on the line $x\ x$ of Fig. 5.

The part $w$ of the guide-piece presents an ascending track, so that directly the roller $o$ has left the course $p$ it is compelled to mount the track $w$, whereby the gang of teeth is slowly turned—i. e., tipped—and the hay which has been taken up again dropped on its reverse side. The ascending track $w$ is longer than the ascending track $v$, whereby the hay in being tedded is strewn over a larger surface (at right angles to the line of travel) than is the case when the ascending course $v$ is in use, when the hay is dumped behind the machine in the line of travel. The stationary track $v$ immediately joins the track $w$, Fig. 5. Directly the roller $o$ has left the concentric track $p\ w\ v$ the rake returns to the initial position by reason of its own weight. The track parts $p\ v$ are carried by a projecting portion 2 of the course $n$. The guide-piece $w\ z$ is secured to the part 2 by means of a pin 3 on the latter passing through a hole in the guide $w\ z$, where it is held by a split pin 4.

The manner of operation of the machine is as follows: The driver throws in the claw or other clutch by means of the lever 6 in the well-known manner common to many agricultural machines. The rotating axle $a$ and gearing $b\ c$ now cause the rake-arms to work. The latter turn with circular motion with the vertical shaft $s$, and directly they are sunk into their lowest position, Fig. 1, by means of the lever 5 they seize the hay, clover, &c. The latter is then dumped by the teeth $k$ in manner depending upon whether the guide $w\ z$ is adjusted for tedding or raking. In the former case the hay will be turned over and deposited in a line laterally of the machine, while in the case of raking the hay will be dumped so as to form an uninterrupted swath behind the machine in the direction of travel.

The advantages attaching to my new machine are: The rakes can be closed up against the wagon, so that the whole machine occupies but little room when out of use. It is not broader than a two-horse agricultural cart, and so can readily travel on narrow roads and over small bridges. The driver's seat is convenient to ascend, and the driver is not exposed to any danger. The combination of rake and tedder avoids the necessity of horses being unharnessed and reharnessed, so that economy of time is effected. Double repairs are for the same reason saved, and there is only one machine to purchase instead of the two ordinarily required. The machine is much easier to work than the ordinary horse-rake, where the driver has always to operate a hand or foot lever for the purpose of dumping the hay. The machine works more quietly and the power required is uniform.

Usually fields are traveled over in the direction of their length. My new hay-rake dumps the hay in longitudinally-running swaths, Fig. 9, so that the hay lies ready for being loaded upon the harvest-wagons, which drive in the same direction immediately adjacent to the swath. On the ordinary system the hay lies in the swath at a right angle to the direction of travel, and so has to be carried before being loaded upon the harvest-wagons, Fig. 10. My machine, moreover, dumps the hay with perfect regularity, so that the swath always forms a straight line, Fig. 9, instead of irregular lines, as ordinarily, Fig. 10. Thus both time and labor are saved and the harvest work rendered in every way cheaper.

When employed as tedder, the machine, as shown in Figs. 11 and 12, slowly lifts and rolls the hay over, so that it is thoroughly turned before being dumped laterally of the machine. In this manner the hay or clover is well preserved. With the ordinary tedder, on the contrary, as shown in Fig. 13, the material is scattered in the air, and by the law of gravity the heavier damp portion falls prior to the dry, and therefore lighter, material. Only a small portion of the hay is therefore really turned over, the rest being simply loosened. In other machines also the raised gang of teeth passing over the hay by no means effects thorough tedding.

What I claim, and desire to secure by Letters Patent, is—

1. In a hay-raking machine, a series of rotary arms, means for rotating the arms, clearing-fingers mounted on the arms, rods mounted on said arms, rake-teeth carried by said rods, means for swinging the teeth independently of their movement by the arms, and a cam-track for raising and lowering the said arms during their rotation, substantially as described.

2. In a hay-raking machine, a series of rotary arms, means for rotating the arms, clearing-fingers secured to the arms, a cam for raising and lowering the arms during their rotation, rods mounted on the arms, rake-teeth secured to the rods, a cam-track comprising two stationary members upon which the rods engage during a portion of the rotation of the arms, and an intermediate member adjustable for controlling the action of the said rods, substantially as described.

3. In a hay-raking machine, a series of rotary arms, means for rotating said arms, a cam for raising and lowering the arms during their rotation, rods swingingly mounted on the arms, rake-teeth secured to the rods, a cam-track comprising two flanged members engaged by the inner ends of the rods during a portion of the rotation of the arms, and an intermediate adjustable flanged member engaged by the rods to control their action, substantially as described.

4. In a hay-raking machine, a series of rotary arms, rakes carried by the arms, a cam for elevating the arms, means for elevating the arms independently of the said cam comprising guide-pulleys, ropes secured to the arms and passing over the guide-pulleys, and means located on the machine for moving the ropes to elevate the arms, substantially as described.

In testimony that I claim the foregoing as my invention I have signed my name in presence of two subscribing witnesses.

PAUL VON DEL NEGRO.

Witnesses:
 HANS PAPPENHEIM,
 ALVESTO S. HOGUE.